(12) United States Patent
Szymansky et al.

(10) Patent No.: US 10,591,065 B2
(45) Date of Patent: Mar. 17, 2020

(54) SEAL FOR SEALING A CIRCUMFERENTIAL GAP BETWEEN TWO MACHINE COMPONENTS

(71) Applicant: Siemens Aktiengesellschaft, Munich (DE)

(72) Inventors: Peter Szymansky, Oberhausen (DE); Fausto Tidona, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/528,466

(22) Filed: Jul. 31, 2019

(65) Prior Publication Data

US 2020/0041004 A1 Feb. 6, 2020

(30) Foreign Application Priority Data

Aug. 6, 2018 (EP) .................................... 18187429

(51) Int. Cl.
*F16J 15/06* (2006.01)
*F16J 15/44* (2006.01)

(52) U.S. Cl.
CPC .................................. *F16J 15/442* (2013.01)

(58) Field of Classification Search
CPC .......... F16J 15/44; F16J 15/441; F16J 15/442; F16J 15/445
See application file for complete search history.

(56) References Cited

U.S. PATENT DOCUMENTS

2008/0100000 A1  5/2008  Justak

FOREIGN PATENT DOCUMENTS

EP  3290756 A1  3/2018

*Primary Examiner* — Gilbert Y Lee
(74) *Attorney, Agent, or Firm* — Beusse Wolter Sanks & Maire

(57) ABSTRACT

A seal for sealing a circumferential gap between two machine components, one of the machine components being mounted such that it can be rotated in the axial direction relative to the other machine component, having a main seal with at least one shoe for establishing a contact-free sealing action between the machine components, and with at least one spring element which supports the shoe on one of the machine components in such a way that a radial movement of the shoe is possible as a reaction to the exertion of fluid pressure on the shoe, and an auxiliary seal which seals the spring element in the axial direction, the auxiliary seal having at least two layers which adjoin one another in the axial direction.

11 Claims, 3 Drawing Sheets

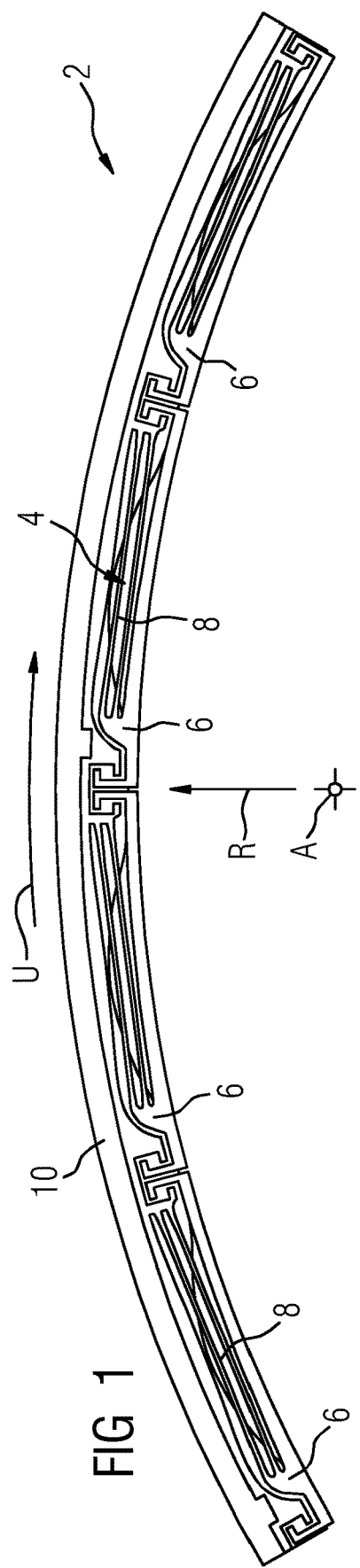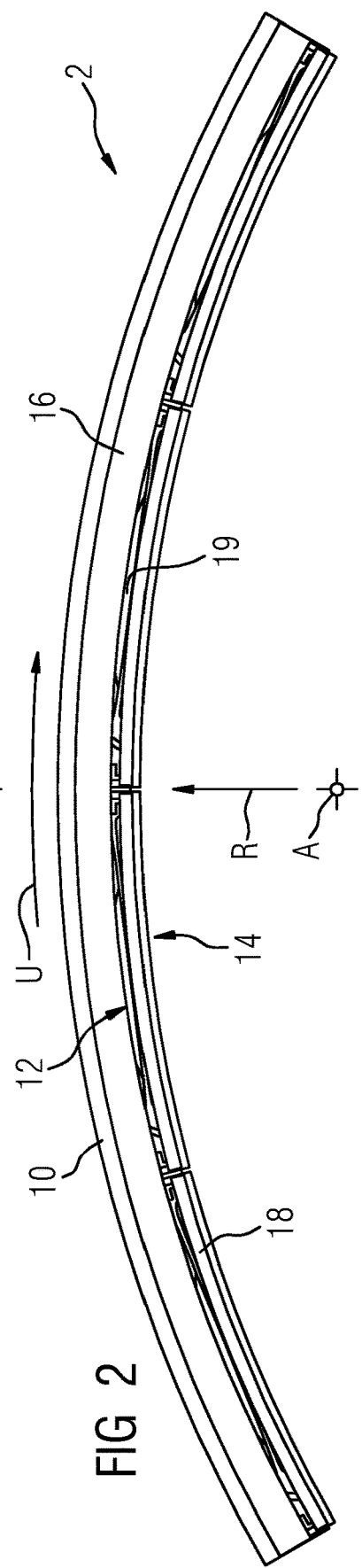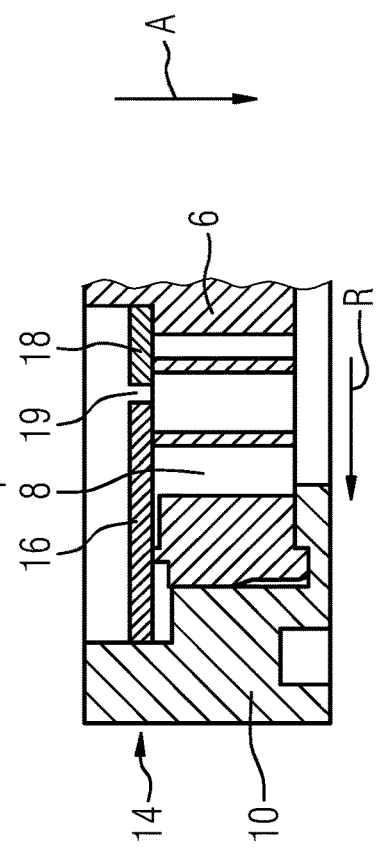

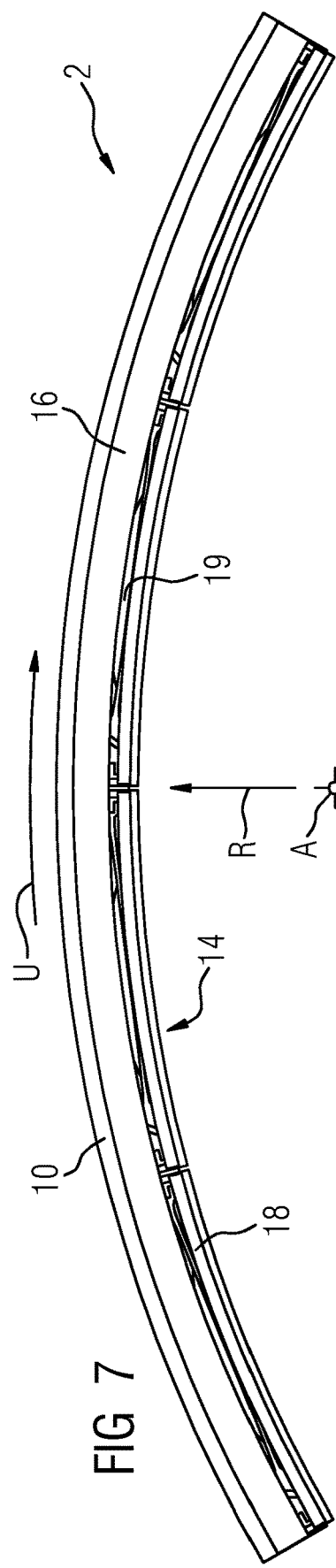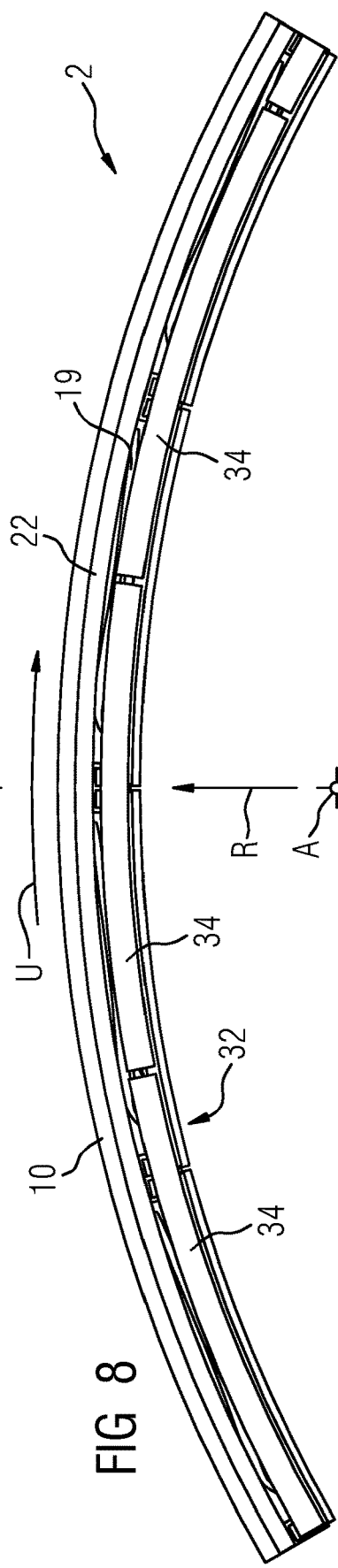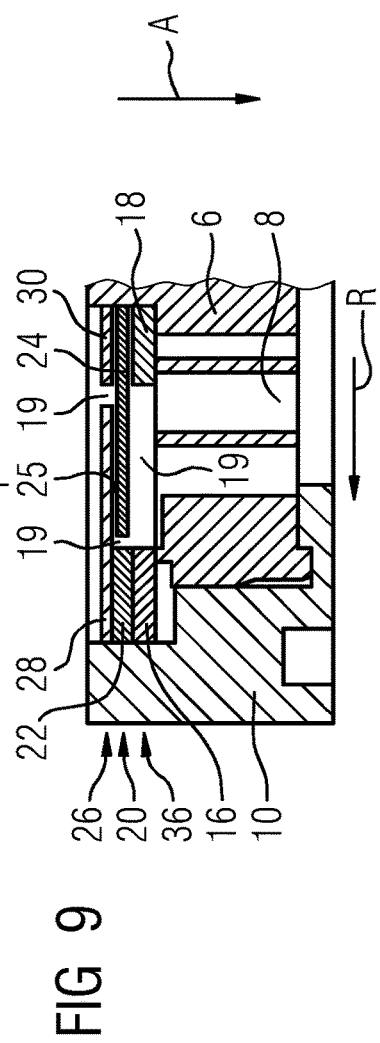

SEAL FOR SEALING A CIRCUMFERENTIAL GAP BETWEEN TWO MACHINE COMPONENTS

CROSS REFERENCE TO RELATED APPLICATIONS

This application claims the benefit of European Application No. EP18187429 filed Aug. 6, 2018, incorporated by reference herein in its entirety.

FIELD OF INVENTION

The invention relates to a seal for sealing a circumferential gap between two machine components, one of the machine components being mounted such that it can be rotated in the axial direction relative to the other machine component, comprising: a main seal with at least one shoe for establishing a contact-free sealing action between the machine components, and with at least one spring element which supports the shoe on one of the machine components in such a way that a radial movement of the shoe is possible as a reaction to the exertion of fluid pressure on the shoe, and an auxiliary seal which seals the spring element in the axial direction, the auxiliary seal having at least two layers which adjoin one another in the axial direction.

BACKGROUND OF INVENTION

A seal in accordance with the preamble of the independent claim is known, for example, from published document US 2008/100000 A1. The seal is used, in particular, for sealing the gap between the rotor and the housing of a turbomachine.

It is an advantage of the above-described seal that the sealing gap is set by way of the volumetric flow which acts across the seal, and is therefore readjusted flexibly in the case of a different position of the rotor and the housing. This operating principle is implemented in what is known as the shoe which is suspended in a sprung manner on a carrier. This system is the main sealing system (also called the main seal).

Said radially flexible seal requires an axial auxiliary sealing system or an auxiliary seal which likewise seals the changing axial gap in a flexible manner. This takes place, for example, via two sheets which are equipped in each case with a spring system, are accordingly pressed on a carrier, and therefore close the opening gap in the direction of the shoe. In order that the two spring systems, that of the shoe and that of the auxiliary seal, can run in parallel in a low-friction manner and at the same time the region of the spring system for the auxiliary seals also remains covered, two components are provided, an intermediate plate and a cover. The latter have a play with respect to the main sealing system and a clearance among one another for the auxiliary sealing system. For the application in a gas turbine, said operating principle has to be realized by way of very intricate components. As a consequence, very high manufacturing accuracies have to be maintained, and a distortion of the components, both as a result of manufacturing inaccuracies and as a result of the influence of temperature, can jam the auxiliary sealing system, and the corresponding thin sheets of the auxiliary seal then cannot close the opening axial gap in the direction of the shoe completely as desired.

SUMMARY OF INVENTION

The invention is based on an object of specifying a seal which has an increased reliability of the functionality in comparison with the prior art and is more suitable specifically for the use in a gas turbine.

According to the invention, the object is achieved by way of a seal for sealing a circumferential gap between two machine components, one of the machine components being mounted such that it can be rotated in the axial direction relative to the other machine component, comprising: a main seal with at least one shoe for establishing a contact-free sealing action between the machine components, and with at least one spring element which supports the shoe on one of the machine components in such a way that a radial movement of the shoe is possible as a reaction to the exertion of fluid pressure on the shoe, and an auxiliary seal which seals the spring element in the axial direction, the auxiliary seal having at least two layers which adjoin one another in the axial direction, the layers comprising at least in each case two sheets which are positioned radially next to one another, per layer, one of the sheets being stationary and the other sheet being mounted movably, by being fastened to the shoe, two movable sheets of in each case two layers which adjoin one another directly having different widths, as viewed in the radial direction, the wider one of the two movable sheets being combined with a thinner, stationary sheet in order to configure the layer, and the thinner one of the two movable sheets being combined with a wider, stationary sheet in order to configure the layer, and the wider movable sheet of the one layer overlapping in the radial direction with the wider stationary sheet of the respective other layer.

The invention is based on the consideration of proposing a seal system, in the case of which no further spring systems are required, the fragility and complex design of which are considered to be one of the critical points of the known auxiliary sealing systems. In the case of the proposed seal, in particular, the intermediate plate is dispensed with, as a result of which the critical interaction between an auxiliary seal in accordance with the prior art and the intermediate plate is circumvented. Since clamping of the auxiliary seal is no longer required, the reliability of the seal is improved considerably. Moreover, the potential re-machining work is reduced considerably, since unevennesses of the sheets of the auxiliary seal no longer play a role. Thanks to the layered construction, the complexity during the assembly of the seal is additionally likewise reduced considerably. There are no longer any systems which act in a complicated manner on the auxiliary seals, as a result of which the design and the assembly are simplified and the number of tests during the manufacture of the seal are reduced.

Here, a layer is understood to mean a single sheet or a radial juxtaposition of two or more sheets which have the same position axial.

In the case of two layers, the axially outer layer overlaps radially in the maximum extended position with parts of the adjoining layer. This can then take place in an alternating manner multiple times. The radially inner layer overlaps on one occasion, and the radially outer layer overlaps on one occasion. The respective shorter sheets which provide space for the overlapping sheets are to be understood merely to be axial spacer elements, in order that the next layer which lies on top once again lies in a planar manner.

A further, single sheet can optionally be applied as the last, outermost layer, which sheet overlaps in the circumferential direction with the layers which lie below it and is fastened directly or indirectly to the carrier. Said layer fulfills a protective function of the thin and sensitive sheets which lie below it for transport, installation and possibly also for operation.

The sheets are expediently configured from a high temperature-resistant and/or corrosion-resistant material, in particular a steel. The movable sheets are configured, in particular, from a material which maintains the required surface quality for configuring sealing faces during the provided operating service life, and meets the requirements for strength during the operation in said time. For high temperature applications, high temperature-resistant steels, nickel alloys or cobalt-based alloys can be selected, such as Inconel®, Haynes® or comparable materials. Corrosion-resistant materials with a sufficient strength are expedient for all applications, even those with relatively low temperature loads, which materials have the necessary surface quality for configuring sealing surfaces over the service life.

In accordance with one embodiment, per layer, a plurality of movable sheets are provided in the circumferential direction, and the wider, movable sheets of the one layer overlap in the circumferential direction with the thinner, movable sheets of the other layer. The overlap which is produced as a result in the circumferential direction additionally improves the sealing properties of the seal.

In accordance with a further embodiment, the layers are arranged out of contact with one another at least in the overlapping region. In the case of the construction of the respective further layers, in particular, thinner sheets can be introduced temporarily between the layer which lies below and the new layer, which thinner sheets are removed again after the fastening of the sheets at their position. As a result, a certain amount of play can be achieved which reduces the friction between the sheet layers and does not block the system under a transverse force of the prevailing pressure.

The sheets of one layer are advantageously arranged out of contact with one another. This is the case, in particular, during the exertion of fluid pressure on the shoe of the seal. Here, the radial gaps which are produced between the sheets of one layer are sealed by the overlap of the sheets of two layers which adjoin one another directly in the radial direction and possibly in the circumferential direction.

At least in the case of one layer, the number of movable sheets advantageously corresponds to the number of shoes. Here, the movable sheets are of circular segment-shaped configuration, and their size is adapted in an optimum manner to the size of the shoes.

The stationary sheet of the innermost layer is advantageously formed by way of an intermediate plate. Said intermediate plate has to be so rigid that it can support the pressure of the other sheet layers. As a result, the axial forces are absorbed by way of the intermediate plate. Pressing of the movable shoe is therefore prevented, since said forces would impair the functionality. As a result, an interaction between movable parts and the rigid outer contour of the seal is separated and the movability is ensured. In the case where, in addition to the intermediate plate, only one further layer of auxiliary seals is introduced, the same basic functionality can be achieved in the case of the lowest number of components.

Furthermore, the movable sheets of the innermost layer are advantageously formed by way of a radial attachment of the shoes. The movable sheets of the innermost layer are therefore an integral constituent part of the shoes, as a result of which the number of necessary components and the number of fastening operations are reduced additionally.

With regard to a particularly satisfactory sealing action of the seal, three layers are provided, the axially innermost and outermost layers being of identical construction. Here, the axially innermost layer and the outermost layer have either in each case a thin, movable sheet combined with a wide, stationary sheet, and the middle layer which lies in between has a wide, movable sheet combined with a thin, stationary sheet, or vice versa.

The movable sheets are advantageously fastened to the shoes. Furthermore, it is advantageous that the seal has a carrier for the main seal, the stationary sheets being fastened to the carrier. In this way, a reliable, disruption-free connection is established between the movable sheets and the shoe and/or between the stationary sheets and the carrier, which connection cannot be released during operation. Plays can be set directly during welding as a result of the layered construction. Moreover, unevennesses can be ignored, since the sheets are welded on directly and corresponding plays can be set by way of temporary spacer elements. Clamping and assembly apparatuses, in particular, are dispensed with as a result. Here, the sheets are, for example, welded on, brazed on, calked in corresponding geometries, or melted on by way of additive methods, or fastened by way of screwing or riveting.

According to the invention, furthermore, the object is achieved by way of two machine components, one of the machine components being mounted such that it can be rotated in the axial direction relative to the other machine component, and a circumferential gap being configured between the two machine components, in which circumferential gap a seal as claimed in one of the preceding claims is arranged, the axial thickness of the axially innermost layer being selected in such a way that the size of a gap between the shoe and the opposite machine component can be set by way of the position of the auxiliary seal. The advantage here is that the required, contact-free gap between the seal and the machine components can be set within the technically acceptable limits via the lever action of the auxiliary seal, due to the position of the sheets.

With regard to a simplified embodiment of the auxiliary seal with precise axial positioning of the sheets on the shoe, the axially innermost layer is advantageously arranged below the sealing layers merely as a spacer element without a sealing action.

BRIEF DESCRIPTION OF THE DRAWINGS

Exemplary embodiments of the invention will be described in greater detail using a drawing, in which:

FIG. 1 shows a plan view of a segment-shaped detail of a seal having a main seal, FIG. 2 shows a plan view of a first embodiment of a seal having a layer of an auxiliary seal with radially overlapping sheets, FIG. 3 shows a cross section through the seal according to FIG. 2, FIG. 7 shows a plan view of a segment-shaped detail of a seal having a first layer of an auxiliary seal, FIG. 8 shows a plan view of a second embodiment of a seal having a layer of an auxiliary seal with sheets which overlap in the radial direction and in the circumferential direction, and FIG. 9 shows a cross section through a third embodiment of the seal.

DETAILED DESCRIPTION OF INVENTION

Figure 4:
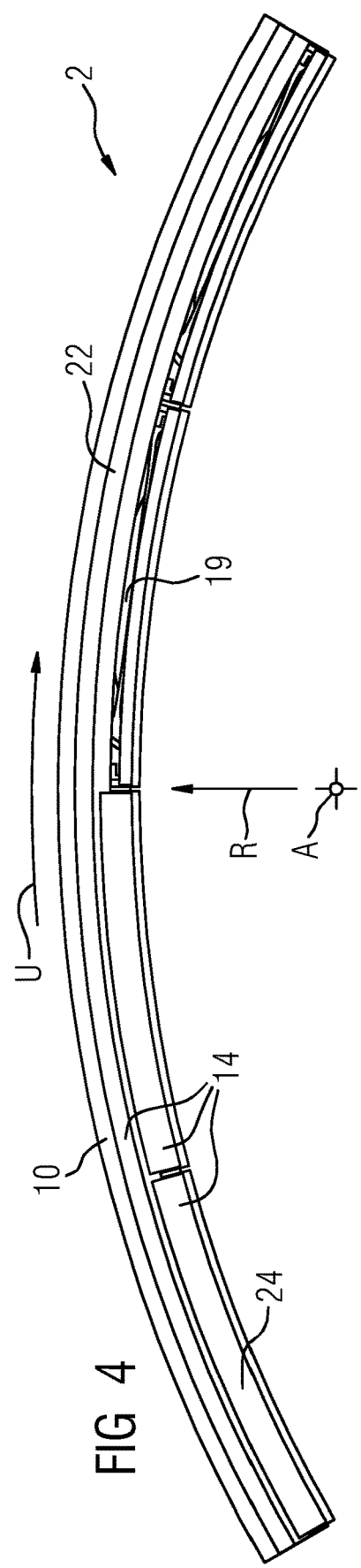
FIG. 4 shows a plan view of the first embodiment of the seal having a second layer of the auxiliary seal.

Identical designations have the same meaning in the figures.

FIG. 1 shows a part of a seal 2 for sealing a circumferential gap between two machine components (not shown in greater detail here) which can be rotated relative to one another in the axial direction. The axial direction is identified symbolically by way of the point A; although the spacing ratios are not maintained in the drawing, the point A is intended to represent the center of the circle which is formed by the complete seal 2. In addition, FIG. 1 shows a radial direction R and a circumferential direction U.

The seal 2 comprises a main seal 4 with a plurality of what are known as shoes 6 for establishing a contact-free seal between the machine components. In order for it to be possible for the function to be fulfilled, the shoes 6 are mounted on a carrier 10 in a sprung manner via in each case one spring element 8. The shoes 6 are supported on one of the machine components by means of the carrier 10 in such a way that a radial movement of the shoes is possible as a reaction to the exertion of fluid pressure on the shoes 6.

Furthermore, the seal 2 comprises an auxiliary seal 12 of layered construction which seals the spring element 8 in the axial direction A, the auxiliary seal 12 having at least two layers which adjoin one another, as viewed in the axial direction A.

A first layer 14 is shown in FIG. 2 and FIG. 3. The first layer 14 is formed by way of two circular or circular segment-shaped sheets 16, 18 which are positioned radially next to one another. The radially outer sheet 16 is stationary, by being supported on the carrier 10. The radially inner sheet 18 is mounted movably, by being fastened to the shoe 6 and moving together with the latter in the radial direction. The radial installation space is not utilized symmetrically by way of the two sheets 16, 18. One of the two sheets 16, 18 is wider and the other is thinner, this assignment being arbitrary (the case is shown here, in which the radially outer and stationary sheet 16 is wider than the inner and movable sheet 18).

The layer 14 is welded directly on the main seal, and the sheets 16, 18 should not be in contact in the maximum pressed position; an inner gap 19 is therefore configured between the two sheets 16, 18.

Figure 5:
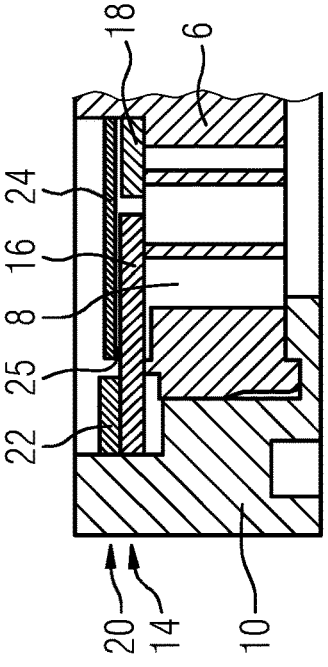
FIG. 5 shows a cross section through the sale according to FIG. 4.

A second layer 20 of the seal 2 can be seen from FIG. 4 and FIG. 5. The second layer 20 likewise comprises a stationary sheet 22 and a multiple-piece, movable sheet 24, the previously radially wider sheet in said layer being thinner, however, in comparison with the first layer and vice versa (the case is depicted here, in which the radially outer and stationary sheet 22 is thinner, and the radially inner and movable sheet 24 is wider).

There is an intermediate gap 25 between the layers 14, 20, with the result that the layers 14, 20 are mounted without contact with respect to one another.

The alternating of thin and wide sheets leads to the wider, movable sheet 24 of the second layer 20 overlapping with the wider, stationary sheet 16 of the first layer 14. A barrier for a fluid which flows in the axial direction A is therefore formed, with the result that the space behind the auxiliary seal 12, in particular the spring element 8, is sealed axially.

As an alternative to the embodiment according to FIG. 2 to FIG. 5, it is possible that the first layer 14 is formed from the wider, movable sheet combined with the thinner, stationary sheet, and the second layer 20 is formed from the thinner, movable sheet combined with the wider, stationary sheet.

Here, the sheets 16, 18, 22, 24 of each layer 14, 20 have the same axial thickness or lie at least in the same axial position. Here, the stationary sheets 16, 22 serve, in particular, as a preparatory surface for the respective next layer, that is to say the height for the stationary sheet of the following layer is produced by way of them. This can also be seen from FIG. 6, from which a third layer 26 is likewise apparent. The third layer 26 comprises a wider, stationary sheet 28, supplemented by way of a thinner, movable sheet 30. In the exemplary embodiment which is shown, the first layer 14 and the third layer 26 therefore have the same construction. The thicknesses and the gaps are designed in such a way that the axially prevailing compressive force always ensures contact of the sheets 16, 18, 22, 24, but prevents jamming among one another or as a result of the axial resilience of the shoe 6.

The stationary sheets 16, 22, 28 are, in particular, circular, semicircular or segment-shaped sheets. The movable sheets 18, 24, 30 are segmented. The number of movable sheets 18, 24, 30 corresponds to that of the shoes 6; in the case of the purely radial overlap, their length in the circumferential direction U also corresponds approximately to the length of a shoe 6. In the case of an overlap in the circumferential direction U, the overall length of all movable sheets 18, 24, 30 in the circumferential direction U corresponds approximately to the overall length of all the shoes 6.

Figure 6:
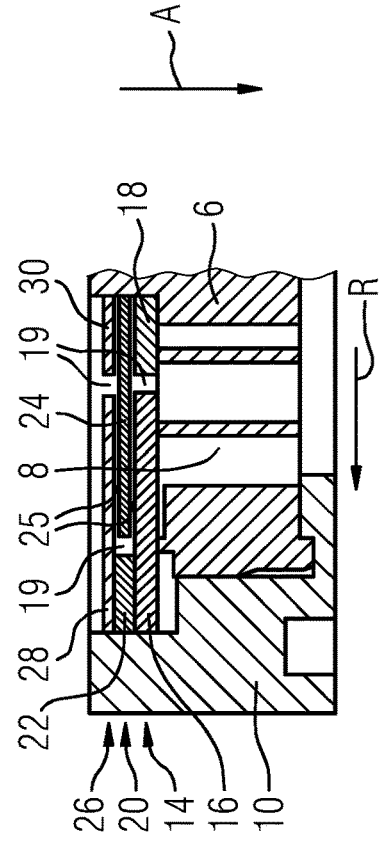
FIG. 6 shows a further cross section through the seal in accordance with the first embodiment having a third layer.

It is additionally also conceivable that the third layer 26 according to FIG. 6 consists merely of the wider, stationary sheet 28 which overlaps with the wider, movable sheet or sheets 24 of the second layer 20.

A further embodiment according to the invention is shown in FIG. 7 and FIG. 8. A first layer 14 of the auxiliary seal 12 can be seen from FIG. 7, which first layer 14 is identical to the first layer 14 according to FIG. 2. In the case of the further layer 32, the stationary sheet 22 is likewise the same as the stationary sheet 22 according to FIG. 4. The segmented, movable sheets 34 are, however, of longer configuration in the circumferential direction, with the result that they overlap with the movable sheets 18 of the first layer 14. An overlap both in the radial direction R and also in the circumferential direction U therefore takes place between the two layers 14, 32.

In a comparable manner with the radial overlap, this construction also begins with an uninterrupted sheet 16 in the circumferential direction U in the radially outer, immovable region, and with segmented sheets 18 which are independent of one another per shoe 6 in the movable region. Said layer 14 is welded directly on the main seal, calked by way of corresponding grooves, brazed or melted on by way of an additively produced overall design, and is not to make contact in the maximum pressed position. This basic position is required in order to avoid friction.

Here, the movable sheets 24, 30 and/or the stationary sheets 22, 28 can also in each case form one unit in structural terms or can be installed as a unit of this type.

In contrast, the next layer 32 differs from the first approach in that the overlap takes place from one movable shoe 6 in the circumferential direction U to the next shoe 6. The next layer in turn is brought about in accordance with the same principle, but overlaps in the opposite direction. Here, the layers 14, 32 which lie above one another in each case can optionally be separated from one another by way of thin spacer sheets during the welding, brazing or calking, in order that the friction is minimized and the abovementioned envisaged gaps are achieved which makes sealing under an axial compressive load possible, but do not jam despite the resilience of the sheets 16, 18, 22, 24, 28, 30 themselves or else of the shoe 6 and the spring elements 8.

A single, somewhat thicker protective sheet (not shown here) can also be applied continuously in the radially outer region as the last and optional layer in this embodiment, which protective sheet overlaps with the segmented sheets 34 which are independent of one another in the radially inner region below. If no sheets have been introduced in the radially outer, immovable region in the layers below this, the corresponding gap (axial overall height of said sheets) has to be taken into consideration. If said optional sheet is introduced, it has to be so rigid that the pressure can be transmitted to the sheet stack. The introduction of a minimum play by way of a temporary, thin intermediate layer during the joining is also appropriate here in order to avoid higher friction.

FIG. 9 shows a further embodiment, in the case of which the sealing action of the auxiliary seal 12 is established merely by way of the second layer 20 and the third layer 26. The first layer 36 is a spacer layer and, here, comprises both a thin, stationary sheet 16 and a thin, movable sheet 18, between which there is a large inner gap 19. The axial position of the sealing layers 20, 26 is defined by way of said layer 36 comprising stationary 16 and movable sheets 18 without a direct sealing action among the sealing layers 20, 26, in such a way that the required, contact-free gap between the seal and the rotatable machine components (rotor) can be set within the technically acceptable limits. If the position of the auxiliary seal 12 is moved axially upstream by way of a thicker spacer layer 36, the gap between the main seal 4 and the rotating machine component opens. If the spacer layer 36 is reduced and therefore the position of the auxiliary seals 12 is moved axially downstream, the gap between the main seal 12 and the rotating machine component closes. Therefore, with the aid of the setting of the thickness of said intermediate layer before final joining, each seal can be subjected to a quality test, and the suitable thickness of said spacer layer 36 can be selected, in order to satisfy the requirements made of the gap between the main seal 4 and the rotating machine component, and to subsequently be assembled and joined in the final state.

The invention claimed is:

1. A seal for sealing a circumferential gap between two machine components, one of the machine components being mounted such that it can be rotated in the axial direction relative to the other machine component, comprising:
   a main seal with at least one shoe for establishing a contact-free sealing action between the machine components, and with at least one spring element which supports the shoe on one of the machine components in such a way that a radial movement of the shoe is possible as a reaction to the exertion of fluid pressure on the shoe, and
   an auxiliary seal which seals the spring element in the axial direction, the auxiliary seal having at least two layers which adjoin one another in the axial direction,
   wherein the layers comprise at least in each case two sheets which are positioned radially next to one another,
   wherein, per layer, one of the sheets is stationary and the other sheet is mounted movably, by being fastened to the shoe,
   wherein two movable sheets of in each case two layers which adjoin one another directly having a different width, as viewed in the radial direction, the wider one of the two movable sheets being combined with a thinner, stationary sheet in order to configure the layer, and the thinner one of the two movable sheets being combined with a wider, stationary sheet in order to configure the layer, and
   wherein the wider movable sheet of the one layer overlapping in the radial direction with the wider stationary sheet of the respective other layer.

2. The seal as claimed in claim 1,
   wherein, per layer, a plurality of movable sheets are provided in the circumferential direction, and the wider, movable sheets of the one layer overlap in the circumferential direction with the thinner, movable sheets of the other layer.

3. The seal as claimed in claim 1,
   wherein the layers are arranged out of contact with one another at least in the overlapping region.

4. The seal as claimed in claim 1,
   wherein the sheets of one layer are arranged out of contact with one another.

5. The seal as claimed in claim 1,
   wherein, at least in the case of one layer, the number of movable sheets corresponds to the number of shoes.

6. The seal as claimed in claim 1,
   wherein the stationary sheet of the innermost layer is formed by way of an intermediate plate.

7. The seal as claimed in claim 1,
   wherein the movable sheets of the innermost layer are formed by way of a radial attachment of the shoes.

8. The seal as claimed in claim 1,
   wherein three layers are provided, the axially innermost and outermost layers being of identical construction.

9. The seal as claimed in claim 1, further comprising:
   a carrier for the main seal, the stationary sheets being fastened to the carrier.

10. A unit comprising:
   two machine components, one of the machine components being mounted such that it can be rotated in the axial direction relative to the other machine component, and
   a circumferential gap being configured between the two machine components, in which circumferential gap a seal as claimed in claim 1 is arranged,
   wherein the axial thickness of the axially innermost layer is selected in such a way that the size of a gap between the shoe and the opposite machine component can be set by way of the position of the auxiliary seal.

11. The unit as claimed in claim 10,
   wherein the axially innermost layer is arranged below the sealing layers merely as a spacer element without a sealing action.

* * * * *